Figure 1:
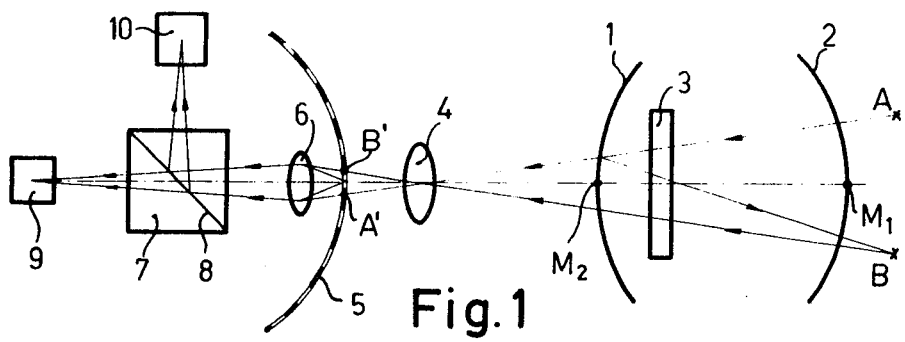

United States Patent
De Lang

[15] 3,659,948
[45] May 2, 1972

[54] OPTICAL DEVICE FOR ALIGNING AN OBJECT LOCATED AT AN ARBITRARY DISTANCE FROM THE DEVICE

[72] Inventor: Hendrik De Lang, Emmasingel, Eindhoven, Netherlands

[73] Assignee: U.S. Philips Corporation, New York, N.Y.

[22] Filed: Apr. 13, 1970

[21] Appl. No.: 27,894

[30] Foreign Application Priority Data

Apr. 23, 1969 Netherlands..........................6906306

[52] U.S. Cl..............................356/110, 250/237, 356/114, 356/141, 356/152, 356/172
[51] Int. Cl. ......................................................G01b 11/26
[58] Field of Search..................356/153, 138, 172, 114, 168, 356/169, 170, 156, 141, 152, 110; 250/237 G

[56] References Cited

UNITED STATES PATENTS

| | | | |
|---|---|---|---|
| 3,438,712 | 4/1969 | Meltzer | 356/153 X |
| 3,175,093 | 3/1965 | De Lang | 250/237 G |
| 3,533,702 | 10/1970 | Hock et al. | 250/237 G |
| 3,198,061 | 8/1965 | Hock | 250/237 G |
| 3,031,919 | 5/1962 | Collyer | 356/153 UX |

FOREIGN PATENTS OR APPLICATIONS 950,765 2/1964 Great Britain..........................356/156

Primary Examiner—Ronald L. Wibert
Assistant Examiner—Jeff Rothenberg
Attorney—Frank R. Trifari

[57] ABSTRACT

An improvement of an optical device for aligning an object located at an arbitrary distance from the device is described in which the device includes two identical or substantially identical concave mirrors the reflecting concave surfaces of which face each other and which each contain the center of curvature of the other mirror, and at least one **/4-plate.

It is shown that by successively including a beam chopper and a beam splitter in the light paths of the beams which emerge from the optical system the device can be adapted to photoelectric alignment without a spatial separation between the observed object and its image.

4 Claims, 2 Drawing Figures

Patented May 2, 1972

3,659,948

*INVENTOR.*
HENDRIK DE LANG
BY
AGENT

OPTICAL DEVICE FOR ALIGNING AN OBJECT LOCATED AT AN ARBITRARY DISTANCE FROM THE DEVICE

Co-pending patent application, U.S. application Ser. No. 780,926, filed Oct. 22, 1968, now abandoned, describes an optical device for aligning objects located at arbitrary distances therefrom. In this device an object to be aligned is visually compared with an inverted image of this object. In this visual observation an accurate adjusting criterion is obtained by a suitable choice of the shape of the object.

However, in aligning processes photo-electric adjustment is frequently required. For this purpose the photo-electric signals derived from the object and from the inverted image thereof must be distinguished from one another. In order to avoid systematic errors, however, it is desirable that the observed object and its image are not spatially separated.

By characterizing the object and its image by light of different qualities it is possible to design an aligning device employing photo-electric detection in which no spatial separation between the object and the image occurs. The differences in light quality may relate to the colors or to the directions of polarization of the light originating from the object and the image respectively. The said application describes a device which enables an image of the object to be formed and the object and the image to be observed in a manner such that the light beams by which the object and the image are observed have directions of polarization at right angles to one another. The application also mentions the possibility of producing a difference in color between the observed object and its image.

The present invention relates to an improvement of an optical device for aligning an object located at an arbitrary distance from the device, in which the device includes two identical or substantially identical concave mirrors the reflecting surfaces of which face one another and which each contain the center of curvature of the other mirror.

The purpose of the invention is the processing of the mutually distinct beams which emerge from the optical device.

For this purpose, the invention is characterized in that a beam chopper and a beam splitter are successively inserted in the light paths of the beams emerging from the optical system.

The invention will be described more fully with reference to the accompanying drawing which shows, by way of example, two embodiments of a device according to the invention.

Figure 2:
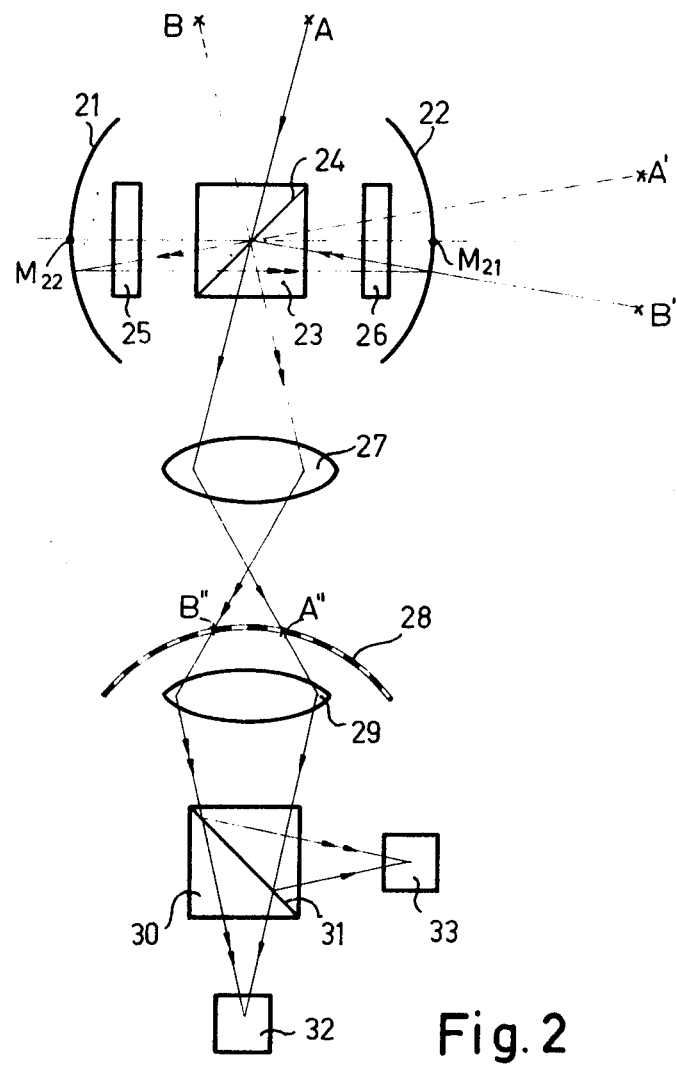

FIG. 1 is a schematic drawing of a first embodiment; and FIG. 2 is a schematic of the second embodiment of the device according to the invention.

In FIG. 1, an image of a slit A from which emanates circularly polarized light is produced at B by a confocal mirror system comprising partially transparent spherical mirrors 1 and 2, in a manner as described in the main application. See FIG. 4 and the associated description in this main application. As has been described therein, the beams originating from the object A and from the image B are polarized at right angles to one another, for the light directly emanating from the object A has passed through the $\lambda/4$-plate 3 once, whereas the light originating from the virtual image B has passed through the $\lambda/4$-plate three-times. According to the invention, the resulting beams are focussed by a lens 4 on a drum grating 5 which comprises alternating light-transmitting and light-absorbing lines and rotates at a uniform speed. Thus the beams traversing the drum grating 5 are periodically chopped.

At a correct alignment, i.e. when the images A' and B' of the object A and the image B respectively coincide, the modulation produced by the movement of the grating is synchronous for light originating from the object A and the image B. In this event the beams passing through the drum grating do not give rise to a mutual phase difference of the signals produced in detectors 9 and 10. However, when the images of the object and the image do not coincide, there will be a phase difference between the signals produced, because the beams are transmitted by the grating at different instants, for they strike the rotating grating at different locations.

The beams emerging from the grating are focussed on the photo-electric detectors 9 and 10 by a lens 6. A polarizing beam-splitting prism 7 is inserted between these photodetectors and the lens 6. The interface 8 of this prism is built up of reflecting layers of alternately high and low indices of refraction. In the case of incidence at the Brewster angle the beams will be transmitted or reflected in accordance with their directions of polarization. Thus, for example, the beam originating from the object A and having a plane of polarization parallel to the plane of the drawing will be transmitted to the detector 9, whereas the beam originating from the image B and having a plane of polarization at right angles to the plane of the drawing will be reflected to the detector 10.

The light signals are converted into electrical signals by the photo-electric cells 9 and 10. These electrical signals are in phase at a correct alignment of the object relative to the axis of the confocal mirror system, but have a phase difference when the object is not aligned.

A distinction between the image and the object is obtainable not only by a suitable choice of the planes of polarization of the light beams originating from the image and the object but also by imparting different colors to the object and the image. In this case, there must be substituted for the element 7 an element which separates the differently colored beams and directs them to separate photocells. An image of the object which is distinguished by its color from the object is obtainable by making the reflection coefficients of the mirrors 1 and 2 frequency-dependent.

In a practical embodiment, the object, in this case a slit about 0.025 mm wide, was arranged at a distance of 2 meters from the equi-confocal mirror system. The drum grating had a facing, projected in the object space, of 0.05 mm. The phase difference between the signals was detectable with an accuracy of about 10°. This results in a lateral setting lying within 1 $\mu$, i.e. expressed in units of angular measurement within 0.1 second of arc.

Obviously, the object may be a grating comprising a large number of parallel slits. In this case the light signal is increased and hence a better signal-to-noise ratio is obtainable.

The use of two systems which each comprise a beam chopper, a beam splitter and two photo-electric cells enables alignment in two directions. By a suitable choice of the object A, for example a crosshair or, when a larger light signal is desired, a cross grating, an accurate adjusting criterion is obtainable. In this case there must be inserted between the equi-confocal system 1,2 and the lens 4 a neutral beam splitter which splits the beams emerging from the equi-confocal system in two orthogonal directions. In each of the resulting light paths there must be included a system comprising two lenses, a beam chopper, a beam splitter and two photocells. Obviously the directions of rotation of the drum gratings in the two light paths must be at right angles to one another.

FIG. 2 shows a second embodiment of an alignment device employing photo-electric adjustment. In the manner described in the main application, an image B of a slit A is formed by a confocal mirror system 21, 22. See FIG. 3 and the associated description in the main application. The beam of natural light emerging from the slit A falls on the interface 24 of a polarizing beam-splitting prism 23 at the Brewster angle. The beam which is transmitted by the interface 24 and is polarized in the plane of the drawing directly falls on a lens 27 arranged outside the mirror system 21, 22. The reflected beam, the plane if polarization of which is at right angles to the plane of the drawing, passes through the confocal mirror system in the manner described in the main application and, when emerging from this system, has a plane of polarization at right angles to the plane of the drawing because of the fact that it has twice passed through diagonally arranged $\lambda/4$-plates 25 and 26. Thus, the light beams originating from the object A and from the image B are polarized at right angles to one another and can be detected in the aforementioned manner by means of a drum grating 28, a beam splitter 30 and photo-electric detectors 32 and 33.

What is claimed is:

1. An optical device for aligning a radiation emanating object located at an arbitrary distance from the device with an optical axis of the device comprising two substantially identical concave mirrors having opposing reflective concave surfaces forming an optical cavity, the centers of curvatures of each of the mirrors lying on the surface of the opposing mirror and forming therewith said axis of the optical device, whereby a first portion of radiation from said object passes directly through and a second portion of said radiation is multiply reflected by the opposing mirrors of the optical cavity before passing out of said cavity, optical encoding means within the optical cavity for imparting a different optically distinguishable quality to each of said portions of said radiation, whereby said first portion of radiation passing through the cavity and said second portion reflected within the cavity are formed into two optically distinguishable beams, a beam chopper in the path of the two optically distinguishable beams, a beam splitter in the path of the radiation passing through the beam chopper for spatially separating the two beams and photodetector means for receiving said spatially separated beams and converting same into electrical signals, whereby the phase relationship between said signals can be used to determine alignment of said object.

2. A device as claimed in claim 1, wherein the beam chopper is a rotating drum grating.

3. A device as claimed in claim 1, wherein the beam splitter is a polarizing beam-splitting prism.

4. An arrangement as claimed in claim 1, wherein the beam splitter is a color-separating element.

* * * * *